United States Patent [19]

Nishimura

[11] Patent Number: 4,640,396
[45] Date of Patent: Feb. 3, 1987

[54] DEVICE FOR CONTROLLING THE OPERATION OF CLUTCH FOR FLUID TORQUE CONVERTER

[75] Inventor: Sadanori Nishimura, Saitama, Japan

[73] Assignee: Honda Giken Kogyo Kabushiki Kaisha, Tokyo, Japan

[21] Appl. No.: 495,267

[22] Filed: May 17, 1983

[30] Foreign Application Priority Data

May 17, 1982 [JP] Japan ................................. 57-81494
Nov. 11, 1982 [JP] Japan ................................. 57-196840

[51] Int. Cl.⁴ ........................ F16H 45/02; B60K 41/02
[52] U.S. Cl. .................................. 192/3.31; 192/0.032; 192/0.076; 192/0.096
[58] Field of Search ............... 192/0.032, 0.033, 0.076, 192/0.092, 0.096, 3.28, 3.29, 3.3, 3.31, 3.33, 103 F

[56] References Cited

U.S. PATENT DOCUMENTS

| | | | |
|---|---|---|---|
| 2,707,887 | 5/1955 | Slack | 192/3.3 X |
| 3,252,352 | 5/1966 | General et al. | 192/3.22 X |
| 3,730,315 | 5/1973 | Annis et al. | 192/3.3 |
| 3,817,357 | 6/1974 | Mori et al. | 192/3.33 |
| 4,002,228 | 1/1977 | Borman | 192/3.3 |
| 4,108,022 | 8/1978 | Arai et al. | 192/3.33 X |
| 4,294,140 | 10/1981 | Iwanaga et al. | 192/3.29 X |
| 4,373,617 | 2/1983 | Mathues | 192/3.31 |
| 4,431,094 | 2/1984 | Parthuisot et al. | 192/3.3 |
| 4,441,385 | 4/1984 | Taga et al. | 192/3.31 X |
| 4,450,941 | 5/1984 | Morris | 192/3.31 |
| 4,516,671 | 5/1985 | Nishikawa et al. | 192/0.076 |

FOREIGN PATENT DOCUMENTS

| | | | |
|---|---|---|---|
| 0156769 | 9/1983 | Japan | 192/3.31 |
| 2076908 | 12/1981 | United Kingdom | 192/3.29 |

Primary Examiner—Rodney H. Bonck
Assistant Examiner—Richard M. Lorence
Attorney, Agent, or Firm—Lyon & Lyon

[57] ABSTRACT

A wheeled vehicle has an internal combustion engine provided with an air intake having a throttle valve. A change speed transmission drives certain of the wheels and receives power from a fluid torque converter having an impeller driven by the engine and a turbine connected to drive the change speed transmission. A clutch establishes a direct drive between the impeller and the turbine under certain operating conditions of the vehicle and the clutch operation is controlled by an hydraulic circuit. Valves and controls are provided in the hydraulic circuit and responsive to the vehicle speed to allow slipping of the clutch at low speeds and direct drive coupling of the clutch at high vehicle speeds. The clutch is further controlled by the throttle opening to limit the direct drive coupling under high vehicle speeds and large throttle openings. In one form the clutch is also controlled by a fluid by-pass mechanism to allow slipping of the clutch during low torque transmitting conditions.

19 Claims, 15 Drawing Figures

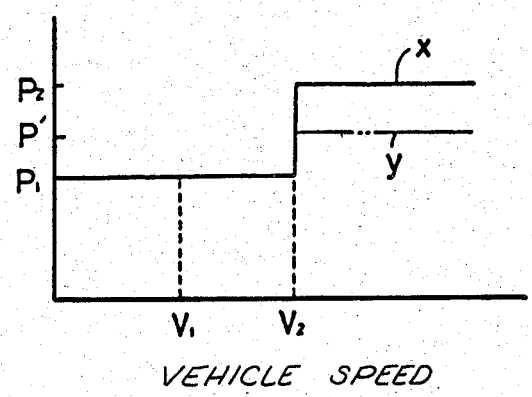

DEVICE FOR CONTROLLING THE OPERATION OF CLUTCH FOR FLUID TORQUE CONVERTER

The present invention relates to a device for controlling the operation of a clutch for a fluid torque converter for a vehicle transmission, and more specifically to a device for controlling the operation of a clutch of this kind, which is provided on the fluid torque converter provided on the vehicle transmission driven by the engine and operable to mechanically connect the input side and output side of the converter under selected vehicle operating conditions.

Devices of this general kind are known, e.g. U.S. Pat. No. 3,252,352, wherein a clutch provided on a fluid torque converter is actuated at a vehicle speed in excess of a predetermined value by means of a clutch control valve responsive to the vehicle speed, and the input side and output side of the fluid torque converter are mechanically directly coupled through the clutch to provide an efficient torque transmission, preventing the slip in the fluid torque converter. In prior arrangements, however, if the predetermined vehicle speed is set to a relatively low value in order to widen the operating range of the clutch, the torque fluctuation of the engine is transmitted to the output side of the fluid torque converter through the clutch, resulting in the occurrence of vibrations of the vehicle body and noises. Therefore, the predetermined vehicle speed is inevitably set to a relatively high value, which results in the undesirable characteristic that the operating range of the clutch is narrow.

Another conventional arrangement has been proposed by U.S. Pat. No. 3,730,315, to overcome the above disadvantages, in which the clutch is adapted to operate in its slip-permitting state over the entire range of torque input and vehicle speed. However, the clutch of that arrangement is kept in its slipping state even during a high speed cruising where little torque fluctuation occurs, and accordingly efficient torque transmission will not result.

This invention has the object of providing a device which overcomes the above-mentioned drawbacks of the prior art. According to the invention, there is provided a transmission installed in a vehicle for transmitting engine output to the driving wheels of the vehicle, which includes a torque converter provided with a clutch for mechanically connecting the input side and the output side of the torque converter, said clutch being operated by a control valve operable in response to selected operating characteristics of the vehicle such as throttle position of the engine and/or the vehicle speed. In one form of the invention, a device is provided for controlling the operation of the clutch for the torque converter of the vehicle, which comprises a selector adapted to select one of two states of the clutch, that is, a coupling state for mechanically directly coupling the input side and the output side of the torque converter, and a slipping state for permitting slipping between the input side and the output side of the torque converter, wherein the selector is operable in response only to the vehicle speed to select the clutch slipping state at a relatively low vehicle speed and the clutch coupling state at a relatively high vehicle speed, which widens the operating range of the clutch over that of the prior art.

In another form of this invention, the selector for switching the operating state of the clutch is responsive to both vehicle speed and the throttle opening of the engine whereby the clutch is allowed to slip when the throttle opening is small even in the high vehicle speed region, for eliminating vibrations and noises caused by reduced throttle opening at high speed when the clutch is directly connecting engine to the transmission.

It is a further object of the present invention to provide a device for controlling the operation of the clutch, in which the operating state of the clutch is not only switched to the direct coupling state and to the slipping state in response to the vehicle speed and the throttle opening but the slip condition in the slipping state is changed in response to the vehicle speed and the throttle opening. This device is characterized in that the slip amount is controlled by the selector so that the amount of slip is relatively large in a region of relatively low vehicle speed and in a relatively small region of throttle opening and is relatively small when the aforesaid condition is not fulfilled.

In the following, embodiments of the present invention will be described with reference to the drawings in which:

FIG. 14 is a diagram showing the operating characteristics of the clutch and FIG. 15 is a diagram showing internal pressure variation characteristics of the torque converter at different vehicle speeds for the embodiment of FIG. 12.

Figure 1:
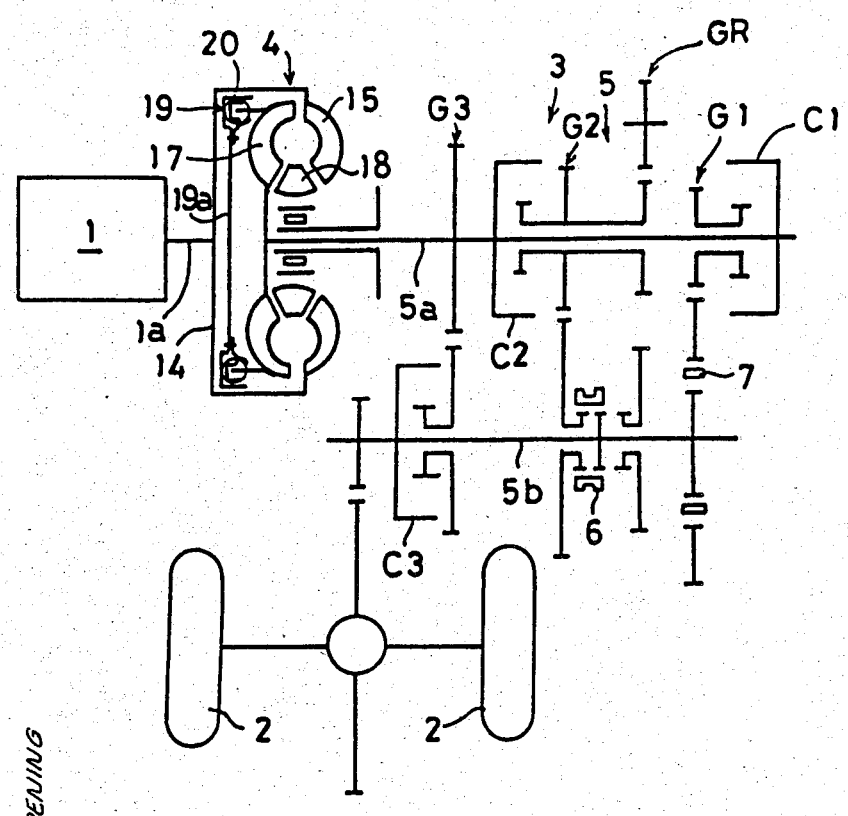
FIG. 1 is a diagramatic illustration of a vehicle drive train from engine to wheels with a multispeed transmission, torque converter and clutch including the present invention.

In FIG. 1, reference numeral 1 designates an engine, 2 driving wheels, and 3 a vehicle transmission disposed to couple the engine 1 to the driving wheels 2. The vehicle transmission 3 is composed of a fluid torque converter 4 and a secondary transmission 5 which provides three forward speeds and one reverse speed.

The secondary transmission 5 has first to third gears G1, G2 and G3 and a reverse gear GR, which are arranged between a driving shaft 5a connected to the torque converter 4 and a driven shaft 5b connected to the driving wheels 2. First to third forward hydraulic clutches C1, C2 and C3 are disposed to be coupled to the first third forward gears G1, G2 and G3, respectively, whereby the gears G1, G2 and G3 are selectively established with the engagement of the respective hydraulic clutches C1, C2 and C3. The second gear G2 and the reverse gear can both be selectively established by the common second hydraulic clutch C2. The reverse gear GR is established by the switching action of a selector gear 6, which selects the gears G2 and GR, to the right hand reverse side in FIG. 1. In FIG. 1, reference numeral 7 designates a one-way clutch disposed for driving engagement with first gear G1, and which acts to permit overspeed rotation of the output shaft 5b.

The hydraulic clutches C1, C2 and C3 are controlled for supply and discharge of fluid, for example, by means of a hydraulic circuit shown in FIG. 2 which is representative of most portions of each embodiment of the hydraulic circuit and will be described in further detail. This hydraulic circuit includes a hydraulic pump or pressure source 8, a manual valve 9 which can be switched by the vehicle operator to one of five positions, i.e., a parking position P, a reverse position R, a neutral position N, a forward position D and a second speed keeping position 2, a shift valve 10 operable in response to the vehicle speed and throttle opening of the engine, and a servo valve 11 for switching between forward and reverse to couple the selector gear 6. When the manual valve 9 is switched to the position D, the first fluid line L1 for supplying fluid leading from the hydraulic pressure source 8 is connected to a second fluid line L2 leading to the shaft valve 10, whereby fluid is supplied to the first speed hydraulic clutch C1 through a third fluid line L3 branching from the second fluid line L2 and also the second and third speed hydraulic clutches C2 and C3 through the shift valve 10. The shift valve 10 includes an upstream side first valve 10-1 for switching between first and second speeds and a downstream side second valve 10-2 for switching between second and third speeds, these valves being connected to each other via a fourth fluid line L4. The individual valves 10-1 and 10-2 are acted on at one end, i.e., the right hand end, by a governor pressure from governor valve 12 corresponding to the vehicle speed and at the left hand end by a throttle pressure from a first throttle valve 13 corresponding to the throttle opening of the engine. When the vehicle speed increases, the first valve 10-1 is switched from the righthand first speed position to the left hand second speed position, whereby the second fluid line L2 is connected to a fifth fluid line L5 on the outlet side of the second valve 10-2 through the fourth fluid line L4. When the manual valve 9 is in the position D, fluid is supplied to the second speed hydraulic clutch C2 through a sixth fluid line L6 connected to the fifth fluid line L5. When the vehicle speed further increases, the second shift valve 10-2 is switched from the righthand second speed position to the lefthand third speed position, whereby the fourth fluid line L4 is disconnected from the fifth fluid line L5 and connected to a seventh fluid line L7 leading to the third speed hydraulic clutch C3 to supply fluid to that third speed hydraulic clutch C3.

In the torque converter 4, a turbine vane wheel 17 is connected to the drive shaft 5a of the secondary transmission 5 and a stator vane wheel 18 is interposed between the vane wheel 17 and a pump vane wheel 15, all of which are provided in an internal space 16 defined by an input case 14 connected to the crankshaft 1a on one side and the pump vane wheel 15 on the other side. The torque converter 4 further includes a clutch 19 for mechanically connecting and disconnecting the input case 14 on the input side of the torque converter 4 to the output side of the turbine vane wheel 17. When the clutch 19 is decoupled, torque is fluidly transmitted with circulation of fluid through the vane wheels 15, 17 and 18. When the clutch 19 is coupled, torque is mechanically transmitted through the clutch 19 to turbine vane wheel 17 which in turn is connected to drive shaft 5a.

Figure 9:
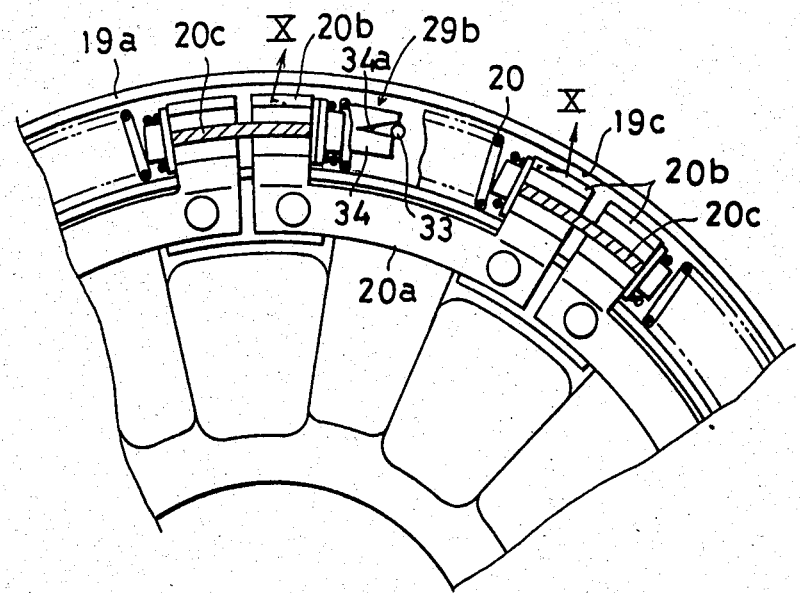
FIG. 9 is a rear elevation view taken on line IX—IX in FIG. 2 showing a portion of the clutch of that embodiment.
Figure 11:
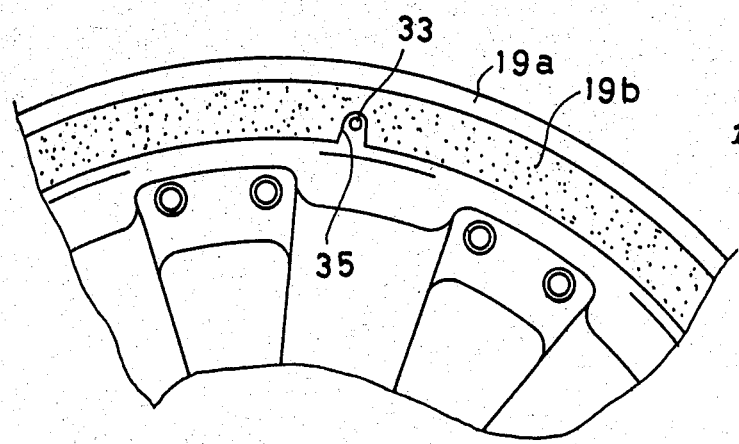
FIG. 11 is a front elevation view taken on line XI—XI in FIG. 2 showing the opposite side of the portion of the clutch shown in FIG. 9.
Figure 10:
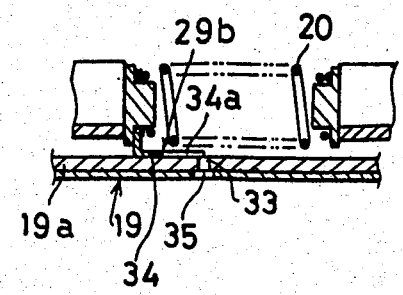
FIG. 10 is a sectional view taken on line X—X of FIG. 9 illustrating a detail of the clutch.

The clutch 19 may be a multi-plate friction clutch or uni-directional clutch or various other types of clutches may be used. The illustrated clutch 19 is a one-plate friction clutch having a clutch plate 19a disposed for axial movement in a space between the input case 14 and the turbine vane wheel 17. The clutch plate is made to engage with and disengage from the input case 14 in response to a pressure difference of fluid acting on both sides of the clutch plate. The clutch plate 19a is connected to the turbine vane wheel 17 through, for example, a damper spring 20. By engagement of the clutch plate 19a with the input case 14, torque is mechanically transmitted through the crankshaft 1a, input case 14, clutch plate 19a, damper spring 20, turbine vane wheel 17 and drive shaft 5a in the order mentioned. The clutch plate 19a is acted upon at a back side thereof by fluid pressure within the internal space 16, i.e., torque converter pressure, and at a front side thereof by fluid pressure within a fluid chamber 16a between said front side and the input case 14. The fluid pressure within the fluid chamber 16a can be reduced by means of a clutch control valve 21, described later in detail, for forward movement of the clutch plate 19a into frictional engagement at a frictional element 19b on the outer peripheral front surface of the clutch plate with the input case 14. As shown in FIGS. 9, 10 and 11, the damper spring 20 comprises coiled springs accommodated in circumferentially spaced relation within an annular recess 19c formed in an outer peripheral back surface of the clutch plate 19a. The clutch plate 19a has a support member 20a mounted thereon to prevent each of said springs 20 from being inwardly dropped out. Retainers 20b and 20b on the input side at both ends are provided and projected from the support member 20a to hold each of said springs 20 between them. Also, a retainer 20c extending from the turbine vane wheel 17 is inserted into a space formed between the springs 20. Assuming now that the rotating direction of the torque converter 4 driven by the engine 1 is in counterclockwise direction in FIG. 9, when the torque is mechanically transmitted as described hereinabove, the turbine vane wheel 17 resists such rotation which is effectively the same as tending to rotate in an opposite direction to that of the clutch plate 19a, that is, in a clockwise direction to provide compressive operation of each spring 20 through the retainer 20c on the output side until the resilient force corresponding to the transmission torque is obtained. Thus, the relative rotational displacement between the turbine vane wheel 17 and the clutch plate 19a varies with the torque transmitted. How this effects the operation of one form of the invention will be described below.

The clutch control valve 21 can be switched between a righthand position (illustrated position), in which the clutch is decoupled by connecting an eighth fluid line L8, which conducts the pressurized fluid from the hydraulic pressure source 8 through a regulator 22, to a ninth fluid line L9 leading to the fluid chamber 16a for supplying fluid to the fluid chamber 16a, and a lefthand position, in which the clutch is coupled by connecting the eighth fluid line L8 to a tenth fluid line L10 leading to the internal space 16 for supplying fluid to the space 16 and to connect the ninth fluid line L9 to a port 23 open to an unpressurized reservoir for discharging fluid from the fluid chamber 16a. The control valve 21 is urged toward the clutch coupling position by a vehicle speed signal corresponding to the vehicle speed, for example, by the governor pressure from the governor valve 12, and with an increase in the vehicle speed beyond a predetermined vehicle speed V1, the control valve 21 is switched to the clutch coupling position to provide the engaging operation of the clutch plate 19a as described above, that is, the coupling operation of the clutch 19.

In the clutch decoupling position, the pressurized fluid which is supplied to the fluid chamber 16a for causing the decoupling movement of the clutch plate 19a also communicates with internal space 16 to provide a torque transmission between the pump vane wheel 15 and the turbine vane wheel 17 for a slipping drive condition.

Further, the throttle pressure from the first throttle valve 13 acts on the control valve 21 to oppose the governor pressure so that the switching to the clutch coupling position can be effected at a higher vehicle speed when the throttle opening increases. An on-off valve 24, which is opened by hydraulic pressure from a twelfth fluid line L12 leading to the third speed hydraulic clutch C3, is connected to the eleventh fluid line L11 which conducts the governor pressure to the control valve 21, whereby the governor pressure acts on the control valve 21 only when the third gear G3 is established. The throttle pressure from the second throttle valve 27 which regulates the back pressure acting on pressure buffering accumulators 25 and 26 for the second and third hydraulic clutches C2 and C3, respectively, in response to the throttle opening is made to act on a cut-off valve 28 connected to the twelfth fluid line L12, so that the valve 28 is closed when the throttle opening is smaller than a predetermined small opening $\theta_1$ to prohibit the direct-coupled operation of the clutch 19 at the time of deceleration.

Figure 14:
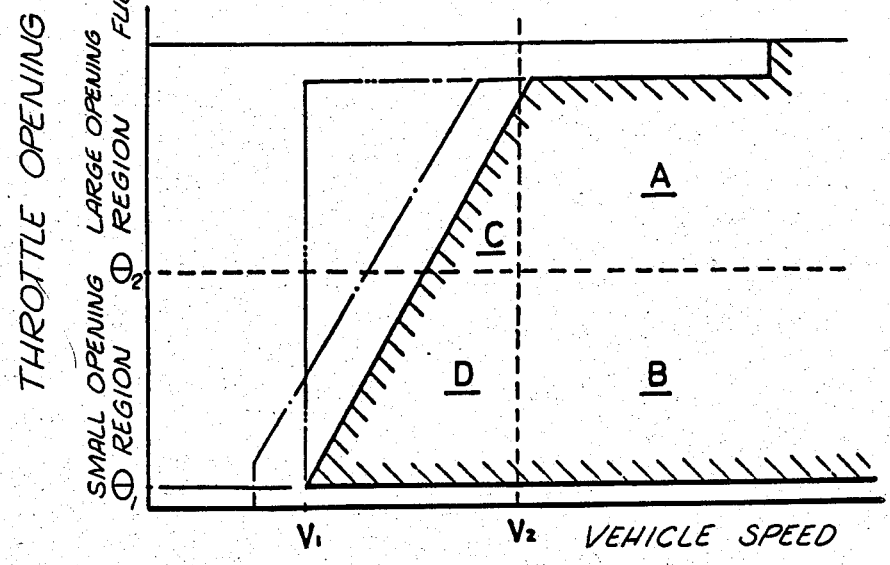

The clutch 19 is operated within the range as indicated by the oblique lines in FIG. 14 which corresponds to the establishment area of the third gear C3 on the right side of the second to third shift line illustrated in phantom lines in FIG. 14.

Figure 3:
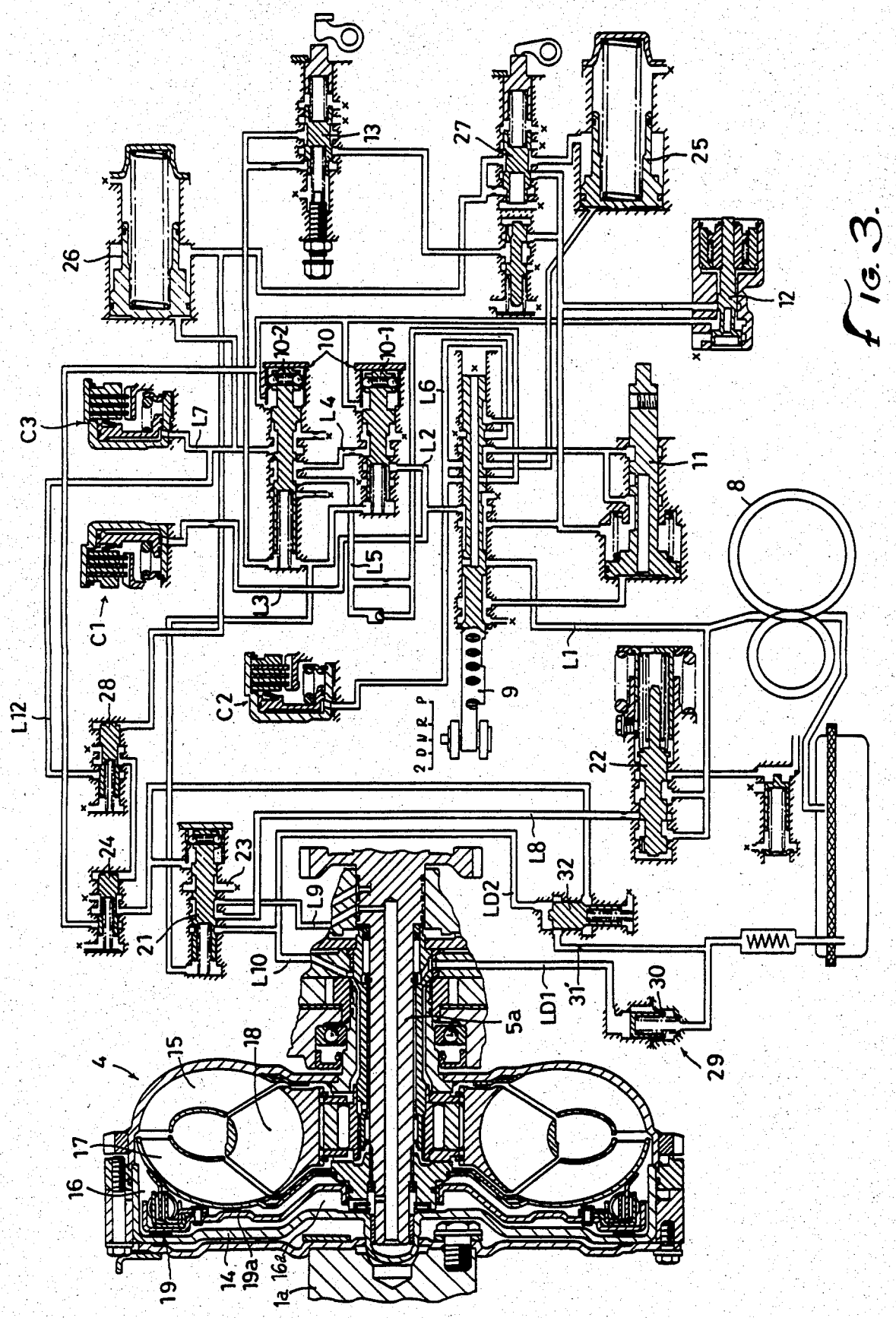
Figure 4:
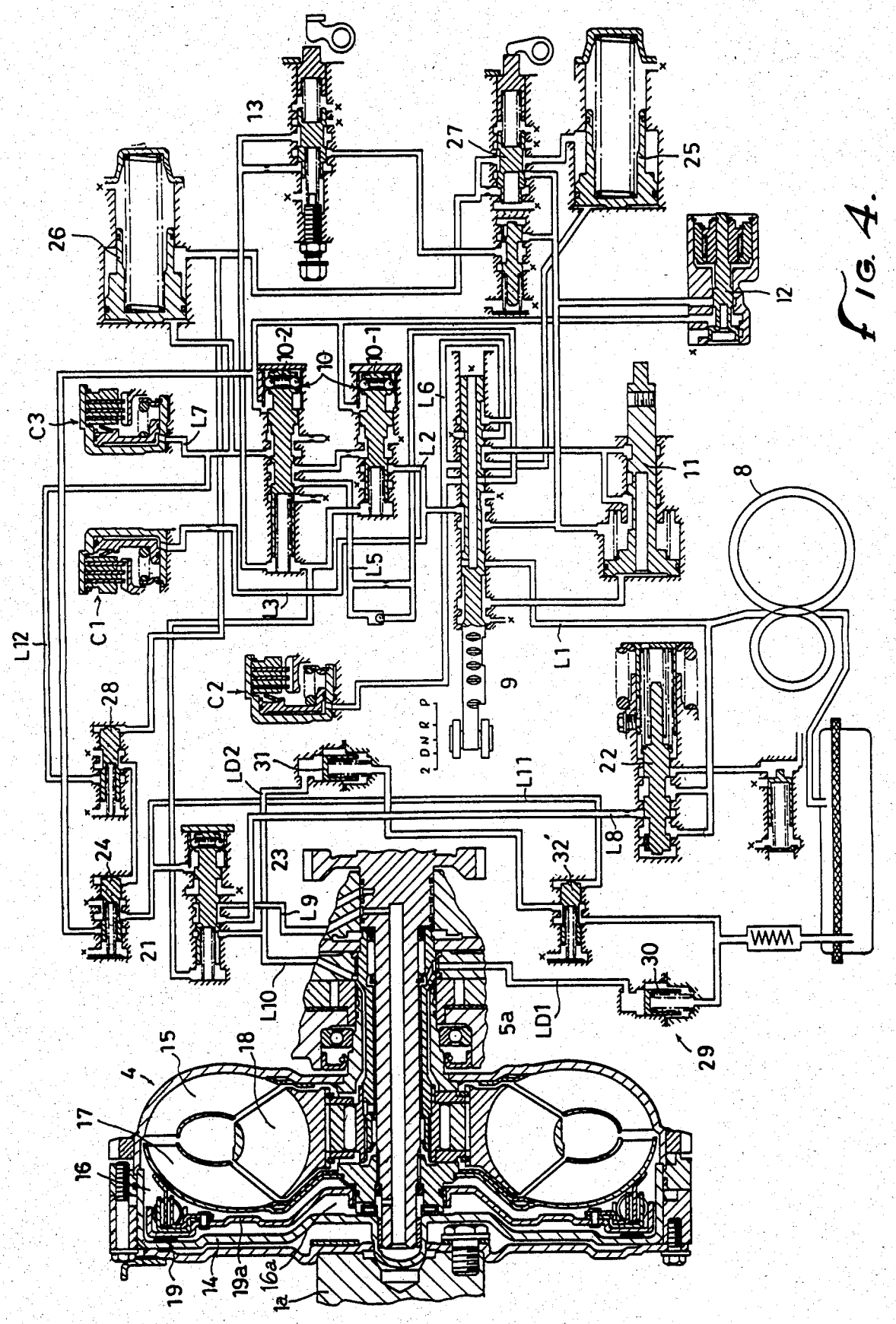

According to the present invention, there is provided a selector 29 (comprised of 29a and 29b in FIG. 2) which can selectively switch the operating state of the clutch 19 to the direct coupling state in which the input side and output side of the fluid torque converter 4 are mechanically directly coupled together and to the slipping state in which a slip is permitted between the input side and output side. In the simpler form of this invention as illustrated in FIGS. 3 and 4 (and the circuit of FIG. 2 without the fluid by-pass illustrated in FIGS. 9, 10 and 11 as described below), the selector switching device 29 is responsive to the vehicle speed with the throttle opening having only the aforedescribed limiting effects whereby the clutch is operated in a slipping state at relatively low vehicle speeds and a direct coupling state at relatively high vehicle speeds. In the other embodiments the switching device 29 is disposed for action responsive to the vehicle speed and the throttle opening so that at a relatively high vehicle speed above V2 and when the throttle opening is above a predetermined value $\Lambda_2$, the direct coupling state is selected, whereas the slipping state is selected in conditions other than the aforesaid condition and the degree of slipping is varied.

In the selector 29, the switching between the direct coupling state and the slipping state is effected by increasing and decreasing the engaging pressure of the clutch 19 which is determined by a pressure difference between the torque converter pressure within the internal space 16 and the fluid pressure within the fluid chamber 16a on both sides of the clutch plate 19a.

Figure 2:
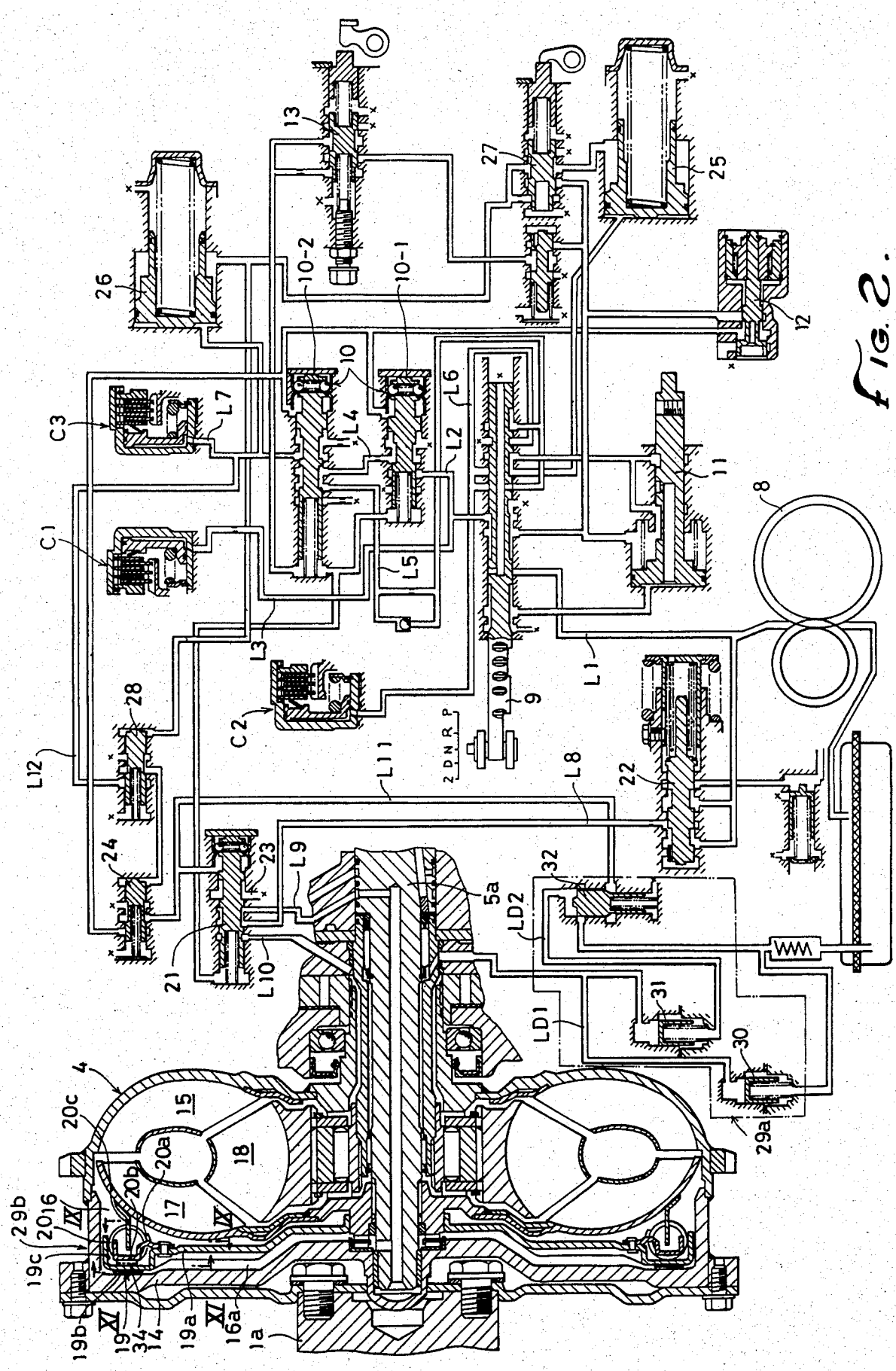
FIGS. 2, 3, 4, 12 and 13 are hydraulic circuit diagrams of five different embodiments of the control and clutch arrangements of this invention for use in the torque converter and transmission as illustrated.

The selector 29 shown in FIG. 2 is composed of a vehicle speed responsive portion 29a incorporated in an external hydraulic circuit which controls the torque converter pressure in response to the vehicle speed and a throttle responsive portion 29b on the side of the clutch 19 which produces a leakage of fluid from the space 16 to the fluid chamber 16a in response to the throttle opening. In the simpler forms of this invention there is no provision for leakage through the clutch 19, which is the only difference in FIG. 2 from the simpler forms and therefore the circuit of FIG. 2 will be described in detail first for a full understanding of the basic arrangement of all the forms.

The vehicle speed responsive portion 29a in FIG. 2 is composed of a first check valve 30 and a second check valve 31 disposed across a first fluid discharge line LD1 and a second fluid discharge line LD2, respectively, which extend parallel to each other, leading to the space 16, and a third check valve 32 disposed in series with the second check valve 31 in the second fluid discharge line LD2. The acting pressure of the first check valve 30 is set to a value P2 which is relatively high enough to obtain the direct coupling state of the clutch 19 whereas the acting pressure of the second check valve 31 is set to a value $P_1$ which is relatively low pressure at which cavitation is not formed in the internal space 16. The third check valve 32 is pressed toward its closing side by the governor pressure from the eleventh fluid line L11. If the vehicle speed increases from the predetermined vehicle speed $V_1$ at which the clutch control valve 21 is switched to the clutch coupling position, the pressing force on the third check valve 32 toward its closing side increases and accordingly the torque converter pressure within the space 16 gradually increases from the value $P_1$ set by the second check valve 31. When the pressure reaches the value $P_2$ set by the first check valve 30 at the predetermined high vehicle speed $V_2$, the value $P_2$ is maintained thereafter. The torque converter pressure changes as shown by the curve a—b—c of FIG. 5 as the vehicle speed increases.

Figure 6:
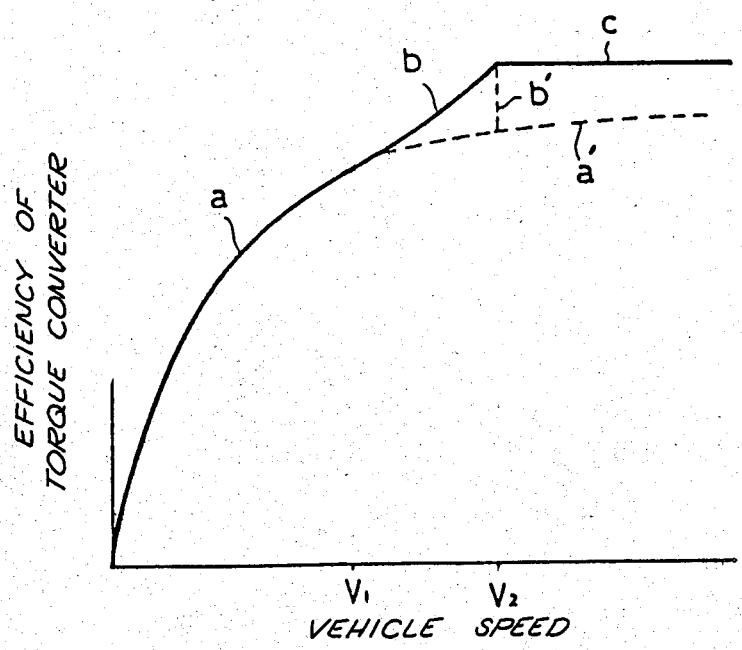

Referring now to the operation of the device as thus far described (i.e. without the throttle responsive mechanism 29b of FIGS. 9, 10 and 11) which is a simpler form of this invention, the torque converter has an efficiency characteristic as shown in FIG. 6, at the time of the vehicle cruising with the third forward gear G3 established. When the vehicle speed is below the speed $V_1$ where the clutch 19 remains inoperative, the torque converter of the invention has an efficiency characteric a which is similar to that obtained by a conventional torque converter. At the speed $V_1$, the clutch 19 is rendered operative. Between relatively low vehicle speeds $V_1$ and $V_2$ the clutch is rendered operative in its slipping state such that a gradual increase in the efficiency of the torque converter is obtained, as shown by the characteristic line b, as the pressure in the space 16 rises. The clutch 19 operates in its direct coupling state with no slip above the relatively high vehicle speed $V_2$, whereby a full efficiency as a value of 1 is obtained as shown by the characteristic line c.

Referring to FIG. 6, an efficiency characteristic a-a' is obtained by a fluid torque converter without the clutch 19. With a conventional torque converter as disclosed by U.S. Pat. No. 3,252,352, the internal pressure and the torque efficiency of the fluid torque converter vary in manners as shown by the lines a-a'-b'-c in FIGS. 5 and 6, if the clutch of the torque converter is adapted to operate at the relatively high vehicle speed $V_2$ so as to prevent transmission of torque fluctuations through the clutch in a low vehicle speed region. As compared with the characteristic line a-b-c obtained by the invention, it is noted that the fluid torque converter of the invention can operate with more efficiency between the vehicle speeds $V_1$ and $V_2$, and can have a much broader highly efficient torque transmission range. Although the engine is apt to bring about fluctuations of torque between the vehicle speeds $V_1$ and $V_2$, the clutch 19 operates in the slipping state in this vehicle speed range, where those fluctuations of torque are absorbed by the slip, resulting in prevention of vibrations and noise.

The throttle responsive portion 29b which is illustrated in detail in FIGS. 9, 10 and 11 will now be described. In view of the fact that the relative rotational displacement of the turbine vane wheel 17 in the reverse direction, that is, in the clockwise direction in FIG. 9, with respect to the clutch plate 19a is varied with the variation of the driving torque of the engine 1 in response to the throttle opening as described hereinbefore, the clutch plate 19a is provided with a communication hole 33, which extends between the opposite side surfaces of the clutch plate 19a, and an on-off member 34 being moved toward the closing side by the increase in said relative rotational displacement. As clearly shown in FIGS. 9 and 10, the communication hole 33 is bored in the clutch plate 19a at a location where one of the damper springs 20 is arranged. The frictional member 19b on the front surface of the clutch plate 19a is formed with a notch 35 as shown in FIG. 11, so that the internal space 16 can communicate with the fluid chamber 16a through the communication hole 33 and the notch 35. The on-off member 34 is formed of a plate having a substantially L-shaped configuration which is slidably mounted on the clutch plate 19a at the counterclockwise end surface of the spring 20. The member 34 is formed with a wedge-like notch 34a which gradually reduces the opening of the communication hole 33 as the member 34 is moved clockwise.

Figure 5:
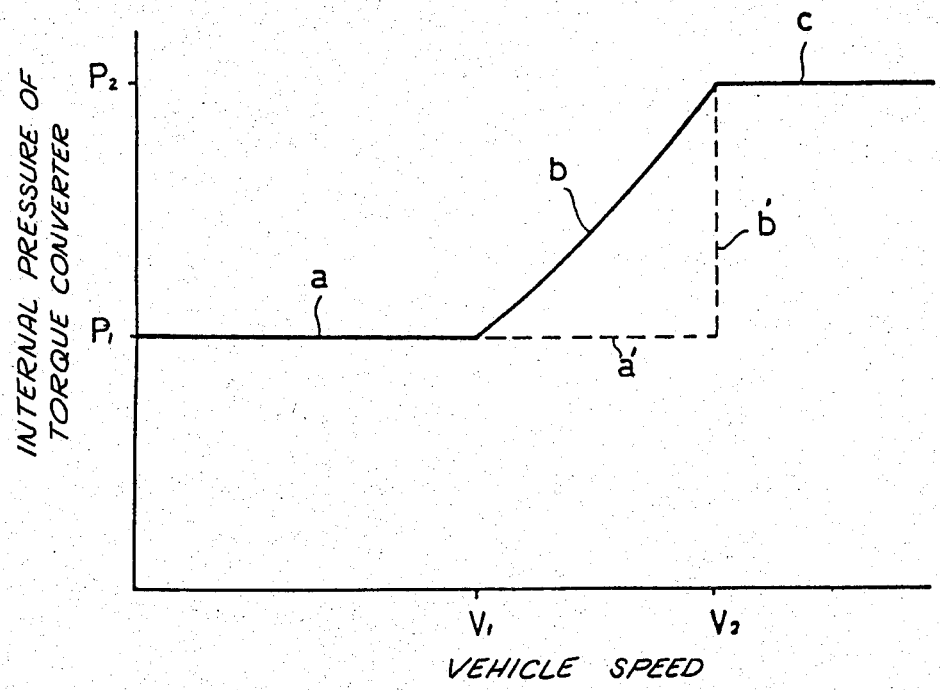
FIGS. 5 and 6 are diagrams showing internal pressure variation characteristics and efficiency, respectively, of the torque converter at different vehicle speeds for the embodiments of FIGS. 2 and 3.

Next, the operation of the device of FIG. 2 will be described with this additional throttle responsive portion 29b as distinguished from the previous description without it. Assuming the vehicle is running at a relatively high vehicle speed above the value $V_2$ within the operating region of the clutch 19 defined by the oblique in FIG. 14. In the region A in FIG. 14 in which the throttle opening is large above the value $\theta_2$, the torque converter pressure is set to the value $P_2$, which is relatively high as shown in FIG. 5, by the vehicle speed responsive portion 29a of the selector 29, and the on-off member 34 of the throttle responsive portion 29b is moved to the position at which the communication hole 33 is closed, with an increase in the relative rotational displacement of the turbine vane wheel 17 in the clockwise direction in FIG. 9 resulting from an increase in the driving torque of the engine 1, whereby the clutch 19 assumes the direct coupling state. On the other hand, in the region B in FIG. 14, the on-off member 34 is moved counterclockwise from the fully closed position due to a decrease in the driving torque to open the communication hole 33, as a consequence of which pressurized fluid within the internal space 16 leaks into the fluid chamber 16a through the communication hole 33, whereby the engaging pressure of the clutch 19 is reduced and the clutch 19 assumes the slipping state. Thus, the torque fluctuation in the region of small throttle opening is absorbed by the slip of the clutch 19.

When the vehicle is running at a relatively low speed between $V_1$ and $V_2$, the torque converter pressure is rendered relatively low by the vehicle speed responsive portion 29a. In the region C of FIG. 14 in which the throttle opening is large above the value $\theta_2$, even if the communication hole 33 is closed by the on-off memter 34, the clutch 19 assumes the slipping state. In the region D of FIG. 14 in which the throttle opening is small below the value $\theta_2$, the communication hole 33 is opened and the clutch 19 is switched to the slipping state wherein the amount of slip is relatively large as compared with that of the regions B and C due to the leakage of pressurized fluid through the communication hole 33, whereby the great torque fluctuation which likely occurs in such a region can be effectively absorbed by the slip of the clutch 19.

FIG. 3 shows another embodiment in which the speed responsive portion of the selector 29 differs in construction from the first embodiment and the throttle responsive portion 29b is omitted although it may be provided in any of the embodiments. The second fluid discharge line LD2, which branches from the tenth fluid line L10, is formed with an orifice 31', which supersedes the second check valve 31 of the first embodiment, and is arranged in series with the third check valve 32. The orifice 31' sets the pressure $P_1$. Except this, the operation is similar to that first described with respect to the first embodiment without the throttle responsive portion.

Figure 7:
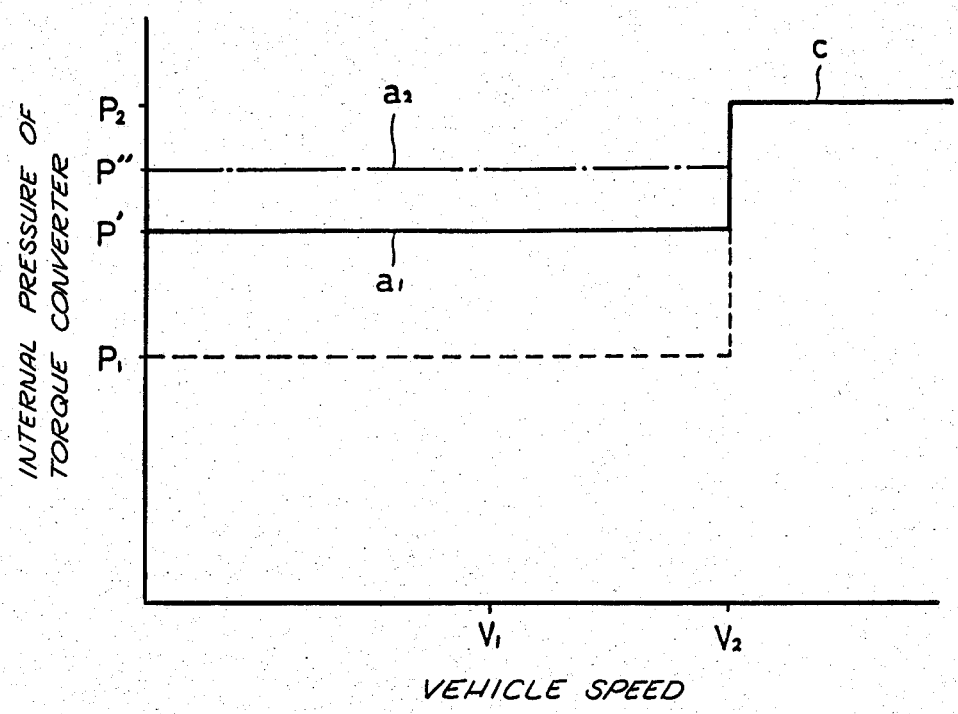
FIGS. 7 and 8 are diagrams showing internal pressure variation characteristics and efficiency, respectively, of the torque converter at different vehicle speeds for the embodiment of FIG. 4.
Figure 8:
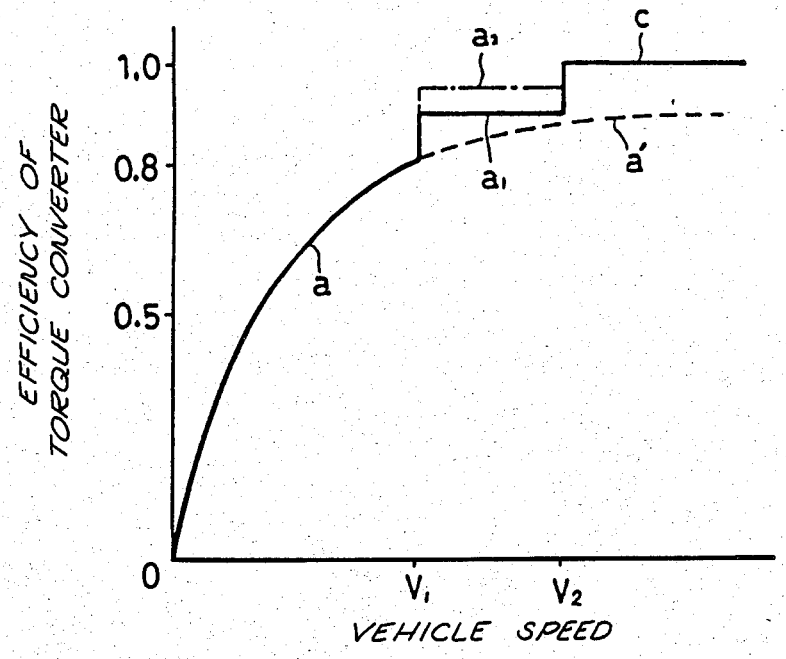

FIG. 4 shows still another embodiment according to the invention, in which the second check valve 31 and an on-off valve 32' are disposed in the second fluid discharge line LD2 in series with each other, the valve 32' superseding the third check valve 32 used in the previous embodiments. The on-off valve 32' is adapted to be urged toward its closed position by the governor pressure and closed at the vehicle speed $V_2$. Further, the second check valve 31 is adapted to operate at pressure P' or P'' between the pressures $P_1$ and $P_2$, so that the internal pressure of the torque converter changes as shown by the characteristic line a1-c or a2-c in FIG. 7. Due to this arrangement, the clutch 19 is operative in its slipping state between the vehicle speeds $V_1$ and $V_2$, and operative in its direct coupling state above the vehicle speed $V_2$, with an efficiency characteristic a-a1-c or a-a2-c as shown in FIG. 8.

Although, in the above embodiments, the throttle pressure acts upon the control valve 21 to oppose the governor pressure so that the switching to the clutch coupling position can be effected at a higher speed as the throttle opening is increased, the control valve 21 may be adapted to operate solely in response to the vehicle speed with no throttle pressure acted thereon. In this case, the torque converter can have a broader operative range of the clutch 19, achieving efficient torque transmission over a wider range than with an arrangement in which the throttle pressure acts on the control valve 21.

As noted above, the vehicle speed responsive portion of the selector according to the invention is adapted to operate in response to the vehicle speed, to select the slipping state at a relatively low vehicle speed and the direct coupling state at a relatively high vehicle speed, respectively. In a low speed range, fluctuations of torque transmitted from the engine are absorbed by the slipping operation of the clutch to prevent vibrations and noise, and in a high speed range, the slippage of the clutch is prevented to obtain high efficient torque transmission. The invention can thus overcome the aforedescribed disadvantages with the conventional arrangements, and can have more efficient torque transmission over a wider range. The throttle responsive portion 29b of FIG. 2 and the hereinafter described embodiments provide still further improvements in operation.

Figure 12:
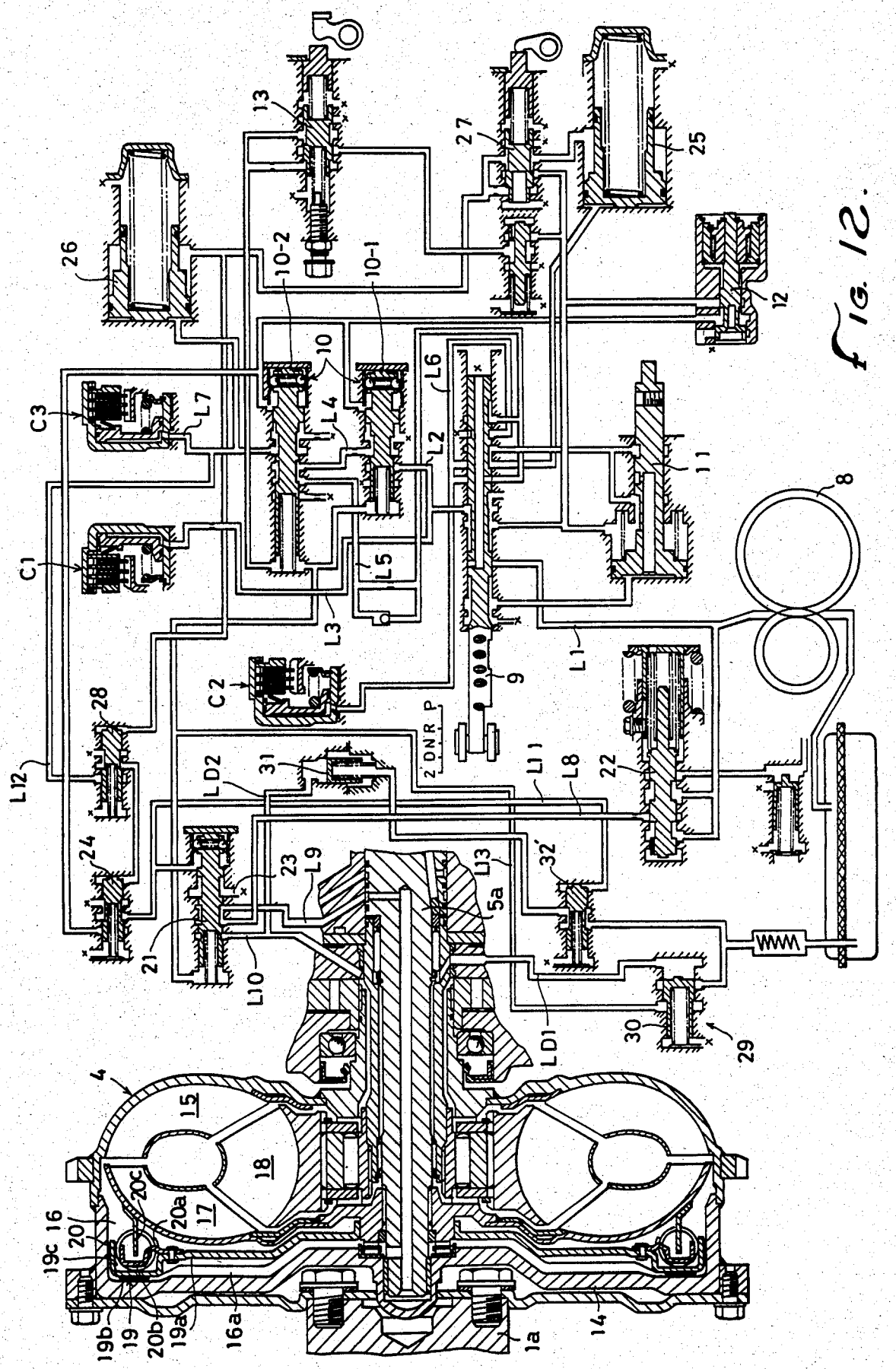

FIG. 12 shows still another embodiment, in which the selector 29 is constructed without the provision of the throttle responsive portion 29b in the clutch 19 as described hereinabove. The first check valve 30, disposed across the first fluid discharge line LD1, is pressed toward the closing side by the throttle pressure from the 13th fluid line L13. In this embodiment, the second fluid discharge line LD2 is connected to the 10th fluid line L10, across which are disposed the second check valve 31 and an on-off valve 32' which is in series with the second check valve 31 and pressed toward the closing side by the governor pressure, and which supersedes the third check valve 32, said valve 32' being closed at a vehicle speed above the value $V_2$.

With this arrangement of FIG. 12, the torque coverter pressure is set to a given pressure level which is relatively low, by the second check valve 31 in the low vehicle speed region below the value $V_2$ as shown in FIG. 15. On the other hand, in the high vehicle speed region above the value $V_2$, the torque converter pressure is increased and decreased as shown by the line x (large opening) and the line y (small opening) in FIG. 15, depending on the throttle opening, by the first check valve 30, and accordingly the clutch 19 is switched to the direct coupling state in the region A and to the slipping state in the other regions B, C and D in FIG. 14.

Figure 13:
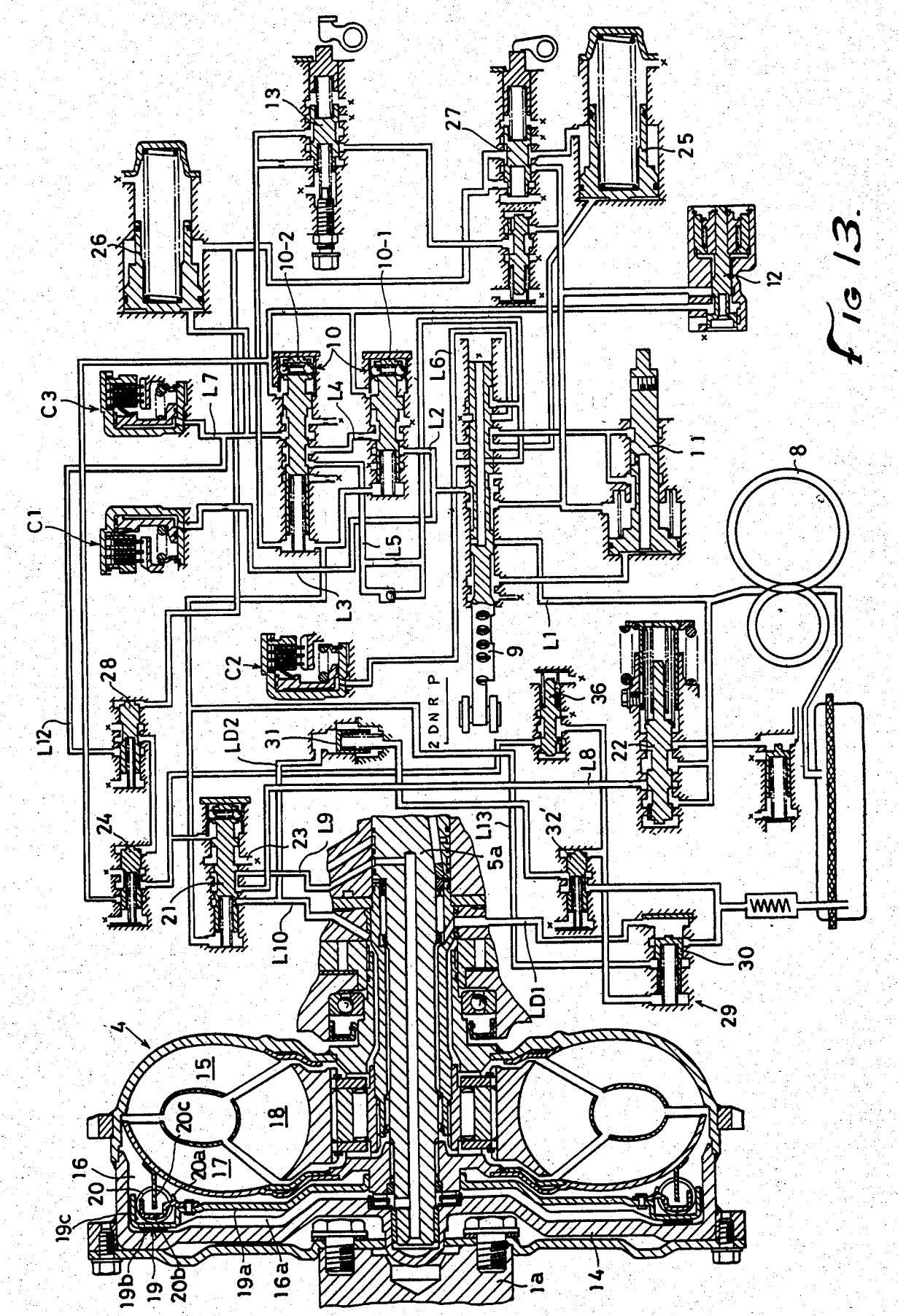

FIG. 13 shows still a further embodiment which is a modification of the aforementioned embodiment of FIG. 12. In this embodiment, the governor pressure is applied to the first check valve 30 to close same, in addition to the throttle pressure. In this case, the on-off valve 32' is closed at a vehicle speed above the value $V_1$, and the governor pressure exerted on the first check valve 30 is prevented from increasing above a given value by means of a modulator valve 36 so that the torque converter pressure is not increased higher than required due to an increase in the vehicle speed.

According to this embodiment of FIG. 13, the torque converter pressure is increased in response to an increase in the vehicle speed and an increase in the throttle opening in the regions above the vehicle speed $V_1$, and the clutch 19 is switched to the direct coupling state in the region A, to the slipping state wherein the amount of slip is large in the region D, and to the slipping state wherein the amount of slip is relatively small in the regions B and C.

According to the present invention, as described above with respect to FIGS. 2, 12 and 13, the selector is disposed for action responsive to the throttle opening in addition to the vehicle speed and can be switched to the slipping state when the throttle opening is small even in the high vehicle speed region in which is selected the direct coupling state of the clutch. Therefore, a torque fluctuation which is relatively great in the region of the small throttle opening can be absorbed by a slip of the clutch. Certain of the inconveniences encountered in the simpler forms of the invention of FIGS. 2 (without portion 29b), 3 and 4 can be eliminated. Furthermore, according to the further embodiments of FIGS. 2 (with the portion 29b), 12 and 13, the slip amount of the clutch in the region of low vehicle speed and small throttle opening wherein the torque fluctuation most likely occurs is made relatively large, and the slip amount in other regions is made relatively small. Therefore, the effect can be obtained that the torque fluctuation is not transmitted and efficient torque transmission can be obtained over the whole region of the clutch operation.

Although specific embodiments of this invention have been described employing specific components, the scope of this invention shall not be limited to those specifics but rather shall be interpreted in accordance with the following claims.

I claim:

1. An apparatus for controlling the operation of a clutch for a torque converter of a transmission of a vehicle having a throttle-operated engine wherein the clutch is operated by differential fluid pressure thereacross between a direct coupling state and a slipping state, the apparatus including; means for fluid pressurizing the clutch to cause the direct coupling state at or above a relatively high speed of the vehicle and depressurizing the clutch to cause the slipping state at relatively low speeds of the vehicle speed including means for controlling and varying the pressure in the clutch in proportion to the vehicle speed when the vehicle is traveling at speeds above a predetermined speed and below the relatively high speed.

2. An apparatus for controlling the operation of a clutch for a torque converter of a transmission of a vehicle having a throttle-operated engine wherein the clutch is operated by differential fluid pressure thereacross between a direct coupling state and a slipping state, the apparatus including; means for fluid pressurizing the clutch to cause the direct coupling state at relatively high speeds of the vehicle and depressurizing the clutch to cause the slipping state at relatively low speeds of the vehicle including means responsive to the engine throttle for pressurizing the clutch in proportion to the throttle position.

3. An apparatus for controlling the operation of a clutch for a torque converter of a transmission of a vehicle having a throttle-operated engine wherein the clutch is operated by differential fluid pressure thereacross between a direct coupling state and a slipping state, the apparatus including; means for fluid pressurizing the clutch to cause the direct coupling state at relatively high speeds of the vehicle and controlled depressurizing of the clutch to cause the slipping state at relatively low speeds of the vehicle including means provided on the clutch and responsive in proportion to the magnitude of torque being transmitted through the clutch to cause pressurized fluid to flow through the clutch to tend to reduce the differential pressure thereacross and depressurize the clutch at the lower levels of transmitted torque, and to prevent that fluid flow through the clutch and depressurizing at higher levels of transmitted torque.

4. An apparatus for controlling the operation of a clutch for a torque converter of a transmission of a vehicle having a throttle-operated engine wherein the clutch is operated by differential fluid pressure thereacross between a direct coupling state and a slipping state, the apparatus including means for fluid pressurizing the clutch to cause the direct coupling state at relatively high speeds of the vehicle and depressurizing the clutch to cause the slipping state at relatively low speeds of the vehicle including valve means for controlling the fluid pressure maintained on the clutch for allowing pressurizing or causing depressurizing of the clutch, said valve means including first check valve means set to open at a pressure for maintaining said direct coupling state and second check valve means having means responsive to the vehicle speed for varying the pressure relief level thereof in proportion to the vehicle speed, said first and second check valves positioned in parallel flow relationship.

5. The apparatus of claim 4 wherein said valve means includes a third check valve positioned in series flow relationship with and between the clutch and the second check valve, said third check valve set at a relatively low pressure level but sufficiently high to maintain a minimum pressure in said clutch.

6. The apparatus of claim 1 wherein means are provided responsive to the engine throttle for pressurizing the clutch in proportion to the throttle position.

7. The apparatus of claim 1 wherein means are provided on the clutch and responsive in proportion to the magnitude of torque being transmitted through the clutch to cause pressurized fluid to flow through the clutch to tend to reduce the differential pressure thereacross and depressurize the clutch at the lower levels of transmitted torque, and to prevent that fluid flow through the clutch and depressurizing at higher levels of transmitted torque.

8. The apparatus of claim 4 wherein means are provided responsive to the engine throttle to tend to cause said pressurizing of the clutch in relatively open positions of the throttle and to cause said depressurizing of the clutch in relatively closed positions of the throttle.

9. The apparatus of claim 4 wherein means are provided on the clutch and responsive to the magnitude of torque being transmitted through the clutch to cause pressurized fluid to flow through the clutch to tend to reduce the differential pressure thereacross and depressurize the clutch at the lower levels of transmitted torque, and to prevent that fluid flow through the clutch and depressurizing at higher levels of transmitted torque.

10. The apparatus of claim 4 wherein said valve means includes means for restricting the fluid flow passed through said second check valve for maintaining a predetermined minimum pressure in the clutch and torque converter even upon opening of said second check valve.

11. The apparatus of claim 4 wherein said valve means includes a third valve in series flow relationship with said second check valve and operable in response to the vehicle speed to be closed above a predetermined speed.

12. The apparatus of claim 11 wherein said first check valve has means responsive to the throttle opening for varying the pressure relief level thereof in proportion to the throttle opening.

13. The apparatus of claim 12 wherein said first check valve has further means responsive to the vehicle speed for varying the pressure relief level thereof in proportion to vehicle speed, and a modulator valve is provided for operating said first check valve to prevent excessive pressure on the clutch and torque converter.

14. The apparatus of claim 3 wherein the clutch includes spring means connecting the clutch to the torque converter for allowing angular displacement therebetween in an amount related to the magnitude of torque being transmitted, and cooperating port and wedge-like notch portions on said clutch and torque converter for progressively opening said port through said notch upon decreasing torque magnitude to allow said fluid flow therethrough.

15. An apparatus for controlling the operation of a clutch for a torque converter of a transmission of a vehicle having a throttle-operated engine wherein the clutch is operated by differential fluid pressure thereacross between a direct coupling state and a slipping state, the apparatus including; means for fluid pressurizing the clutch to cause the direct coupling state at relatively high speeds of the vehicle and depressurizing the clutch to cause the slipping state at relatively low speeds of the vehicle including valve means for controlling the fluid pressure maintained on the clutch for allowing pressurizing or causing depressurizing of the clutch, said valve means including first check valve means set to open at a pressure for maintaining said direct coupling state and second check valve means having means responsive to the vehicle speed for varying the pressure relief level thereof in proportion to the vehicle speed, said first and second check valves positioned in parallel flow relationship, means responsive to the engine throttle to tend to cause said pressurizing of the clutch in relatively open positions of the throttle and to cause said depressurizing of the clutch in relatively closed positions of the throttle, and means provided on the clutch said responsive to the magnitude of torque being transmitted through the clutch to cause pressurized fluid to flow through the clutch to tend to reduce the differential pressure thereacross and depressurize the clutch at the lower levels of transmitted torque, and to prevent that fluid flow through the clutch and depressurizing at higher levels of transmitted torque.

16. For use in a wheeled vehicle having an internal combustion engine provided with an air intake having a throttle valve, the improvement comprising, in combination: a change speed transmission, a fluid torque converter having a first part driven by the engine and a second part connected to drive certain of the wheels through said change speed transmission, a releasable clutch for connecting said first and second parts of said torque converter in direct driving relationship, means including an hydraulic circuit for driving the vehicle from said engine through said transmission at a plurality of speed ratios, said means including a manually operable transmission ratio selector, and also including an operator responsive to vehicle speed as modified by the selector, said operator acting to engage said clutch when the vehicle speed exceeds a predetermined level, and control means in said hydraulic circuit responsive to the vehicle speed to prevent engagement of the clutch when the vehicle speed is below a predetermined minimum and including means for controlling and varying the pressure in the clutch in proportion to the vehicle speed at speeds below the predetermined level and above a second, lower predetermined level.

17. For use in a wheeled vehicle having an internal combustion engine provided with an air intake having a throttle valve, the improvement comprising, in combination: a change speed transmission, a fluid torque converter having a first part driven by the engine and a second part connected to drive certain of the wheels through said change speed transmission, a releasable clutch for connecting said first and second parts of said torque converter in direct driving relationship, means including an hydraulic circuit for driving the vehicle from said engine through said transmission at a plurality of speed ratios, said means including a manually operable transmission ratio selector, and also including an operator responsive to vehicle speed as modified by the selector, said operator acting to engage said clutch when the vehicle speed exceeds a predetermined level, and control means in said hydraulic circuit responsive to both vehicle speed and throttle valve opening to cause controlled slipping of the clutch when either the vehicle speed or the opening through said engine throttle valve is below a predetermined minimum.

18. The improvement of claim 17 wherein said control means includes two check valves positioned in said hydraulic circuit in parallel flow relation and operable separately to maintain different fluid pressures on said clutch for operating said clutch.

19. For use in a wheeled vehicle having an internal combustion engine provided with an air intake having a throttle valve, the improvement comprising, in combination: a change speed transmission, a fluid torque converter having a first part driven by the engine and a second part connected to drive certain of the wheels through said change speed transmission, a releasable clutch for connecting said first and second parts of said torque converter in direct driving relationship, means including an hydraulic circuit for driving the vehicle by the engine through said transmission at a plurality of speed ratios, said means including a manually operable transmission ratio selector, and also including an operator responsive to vehicle speed as modified by the selector, said operator acting to close said clutch when the vehicle speed exceeds a predetermined level, control means in said hydraulic circuit responsive to the vehicle speed to prevent closing of the clutch when the vehicle speed is below a predetermined minimum, and said clutch including fluid by-pass means operable to by-pass fluid in proportion to the magnitude of torque being transmitted therethrough to allow slipping of the clutch at low torque levels regardless of vehicle speed.

* * * * *